Jan. 19, 1937.  R. P. ADAMS  2,068,048

FILTER

Filed June 28, 1935

Inventor -
R. P. Adams
by

Patented Jan. 19, 1937

2,068,048

UNITED STATES PATENT OFFICE 2,068,048

FILTER

Renard Paul Adams, Buffalo, N. Y.

Application June 28, 1935, Serial No. 28,819

3 Claims. (Cl. 183—44)

My invention relates to improvements in filters, and the object of my invention is to provide a very simple device for filtering air, gas, or in certain cases, steam.

A further object of my invention is to devise a filter comprising a combination of an improved centrifugal separator and a highly porous tube shaped filter medium, wherein the greater percentage of the entrained moisture, oil or other foreign matter is removed by my centrifugal separator, and the small balance completely removed by the passage of the fluid being filtered through the porous tube.

Figure 1:
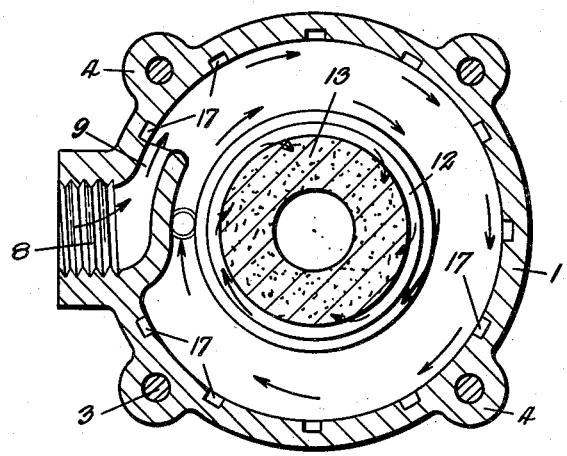
Figure 2:
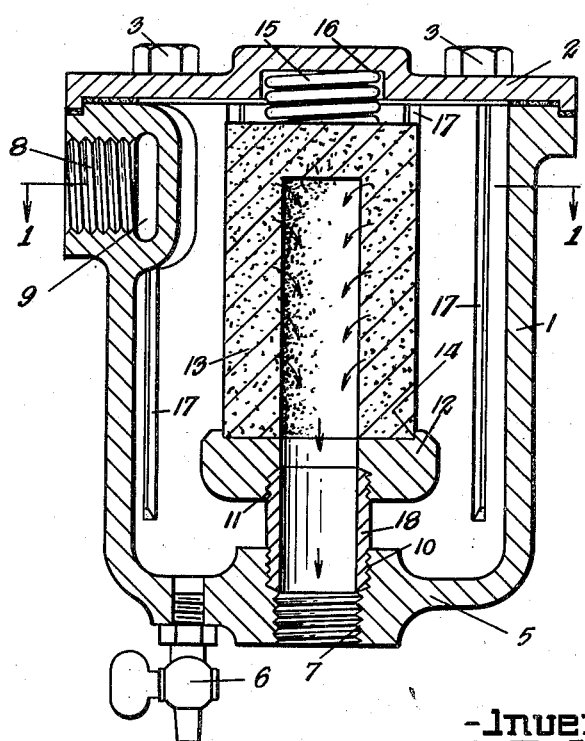

My invention consists of the features of construction, combination and arrangement of parts, all as hereinafter described and illustrated in the accompanying drawing in which:

Figure 1 is a horizontal cross sectional view through my filter, being taken through the line 1—1 Figure 2, and Figure 2 is a vertical cross sectional view through my device.

Like characters of reference indicate corresponding parts in the two views of the drawing.

The filter casing 1 is of cup shape, and sealed at its upper open end by a closure plate 2. The plate is tightly secured in place by screws 3 which pass therethrough and are threaded into bosses 4 formed in the upper end of the outside face of the cup 1.

The lower portion of the cup 1 constitutes a sump for the reception of centrifugally removed moisture etc., and the cup bottom 5 has a draw-off pet cock 6 depending downwardly therefrom for draining the sump. The cup bottom 5 also has a threaded orifice 7 extending therethrough for the reception of the threaded end of a filtered fluid outlet pipe. A fluid inlet orifice 8 extends through the wall of the cup at its upper end and opens into a circumferentially directed nozzle 9 positioned in close proximity to the under face of the plate 2.

The orifice 7 has a length of tube 18 threaded into its enlarged upper end 10 and which projects upwardly into the cup 1. The upper end of the tube is threaded into an orifice 11 passing through a circular base 12 upon which the porous element is supported above the sump portion of the chamber. The porous element is in the form of an inverted tube shaped pot 13 of greater length than diameter, and having its lower face resting within a circular recess 14 in the upper face of the base 12. The pot is tightly held in place on the base by a spiral spring 15 interposed between the top of the cup and a recess 16 in the under face of the plate 2.

The pot is preferably formed of a porous, molded and vitrified material, having a porosity of 34 to 38% of its total volume. The inner face of the cup 1 is formed with a plurality of vertical grooves 17 for the reception of centrifugally removed moisture. The moisture collects in the grooves and runs downwardly to drop into the sump.

The operation of my device is as follows:

The fluid to be filtered i. e. air, gas or steam enters the cup at a high velocity through the nozzle 9 from the inlet orifice 8 which is connected to a suitable supply pipe. The fluid in the cup follows a whirling path as indicated by the arrows in Figure 1, and the condensates or other filterable matter in the fluid are centrifugally thrown outwardly and against the wall of the cup, where they in their tangential movement catch in the grooves 17 and flow downwardly in the grooves to the sump. A maximum separation is attained by utilizing the high fluid velocities around the inner face of the cup, as at this point the separation factor is greatest and the condensates find no difficulty in leaving the fluid stream.

As the whirling fluid approaches the axis of the cup 1, it passes through the porous wall of the filter pot 13, and from thence down the central passage in the pot, as indicated by the arrows in Figure 2, through the tube 18 and exits through the orifice 7 which is connected to a fluid outlet pipe. All dust, dirt and foreign matter collects on the surface of the filter pot, while oil or water enters the porous structure and is retained from passing therethrough. The filter pot is periodically removed, by removal of the closure plate 2, and replaced by another filter pot, or immediately cleaned with some suitable oil solvent and, after drying, replaced. The filter pots may be cleaned with acid, or if serious clogging by carbonaceous material occurs, it is necessary to reburn the pots in a kiln to restore their permeability.

In cases where the temperature of air or gas to be filtered is comparatively high, a suitable cooling coil may be inserted in the cup, as shown in United States Patent No. 2,009,352 issued July 23rd, 1935, though in the filter shown in this present application the coil would be positioned exteriorly of the filter pot 13 so that the air or gas would be cooled and thorough condensation attained before passing through the pot.

What I claim as my invention is:

1. A fluid filter of the character described, comprising a substantially cylindrical fluid swirling chamber, a fluid entrance nozzle opening into the upper end of the chamber in a horizontal and substantially tangential direction whereby the fluid entering the chamber from the nozzle has a horizontal flow, a condensate receiving sump formed in the bottom of the chamber, a tube of porous filtering material positioned in the chamber in the vicinity of the axis thereof and having its upper end adjacent to the nozzle and its lower end positioned above the sump portion of the chamber, and a fluid exit extending from the lower end of the bore of the tube to the exterior of the chamber.

2. A fluid filter of the character described, comprising a substantially cylindrical fluid swirling chamber, a fluid entrance nozzle projecting into the chamber in a horizontal and substantially tangential direction whereby the fluid entering the chamber from the nozzle has a horizontal flow, the inner wall of the chamber being formed with a plurality of condensate receiving grooves extending downwardly towards the bottom of the chamber, a condensate receiving sump formed in the bottom of the chamber, a tube of porous filtering material positioned in the chamber in the vicinity of the axis thereof and having its upper end adjacent to the nozzle, and a fluid exit containing member positioned underneath the tube and supporting it above the sump in the bottom of the chamber and having its exit orifice communicating with the bore of the tube.

3. A fluid filter of the character described, comprising a substantially cylindrical fluid swirling chamber, a fluid entrance nozzle opening into the chamber in a substantially tangential direction, the inner wall of the chamber being formed with a plurality of condensate receiving grooves extending downwardly towards the bottom of the chamber, a tube of inverted pot shape formed of porous material and positioned in the chamber substantially coaxially therewith, a hollow pedestal element extending upwardly from the bottom of the chamber to constitute a support for the porous pot and a fluid exit passage therefrom, a removable closure plate for the top of the chamber, and a compression spring interposed between the top of the filter pot and the bottom of the plate.

RENARD PAUL ADAMS.